ary movement therewith,
United States Patent
Booth

[15] 3,675,118
[45] July 4, 1972

[54] MULTI-PROBE METOD AND APPARATUS FOR DETECTING, CORRELATING AND CLASSIFYING DEFECTS IN TEST MEMBERS

[72] Inventor: Robert C. Booth, Bethlehem, Pa.
[73] Assignee: Bethlehem Steel Corporation
[22] Filed: April 21, 1970
[21] Appl. No.: 30,397

[52] U.S. Cl. ............................................. 324/37
[51] Int. Cl. ........................................... G01r 33/12
[58] Field of Search .............................. 324/37, 40

[56] References Cited

UNITED STATES PATENTS

| | | | |
|---|---|---|---|
| 3,534,258 | 10/1970 | Forster | 324/37 |
| 3,518,697 | 6/1970 | Martens | 346/33 F |
| 3,568,051 | 3/1971 | Vild | 324/37 |
| 2,770,773 | 11/1956 | Cooley | 324/37 |
| 3,445,672 | 5/1969 | Marks | 346/33 F |

FOREIGN PATENTS OR APPLICATIONS 950,696 2/1964 Great Britain ........................ 324/37
46,069 1/1963 Poland .................................. 324/41

Primary Examiner—Robert J. Corcoran
Attorney—Joseph J. O'Keefe

[57] ABSTRACT

Nondestructive test apparatus detects both straight and skewed defects in test members such as steel billets and bars having flat surfaces. Detecting means, including a plurality of probes adapted to scan a surface of said member sequentially and cyclically during relative lengthwise movement therewith, produces a plurality of electrical signals representative of defects detected in said member. The plurality of electrical signals are selected sequentially one at a time by a multiplexer. The selected electrical signals cause defect pulses to be produced and those pulses are coordinated with probe position signals in electronic circuits which classify the defects according to location, or location in combination with level of defect severity and/or length, in a longitudinally extending section of the test member. A signal correlator may be added to reject noise and false defect pulses as well as to accommodate skewed defects when either or both such situations are encountered. The finally processed defect pulses are utilized, for example, to activate reworkable or rejectable defect markers downstream of the probe over each section of the scanned surface where the defects occurred in said member 18 Claims, 3 Drawing Figures SECTION     DEFECT STORAGE   DEFECT MARKING
GATING CIRCUITS  SHIFT REGISTERS  DURATION COUNTERS INVENTOR
Robert C. Booth INVENTOR
Robert C. Booth 3,675,118

MULTI-PROBE METOD AND APPARATUS FOR DETECTING, CORRELATING AND CLASSIFYING DEFECTS IN TEST MEMBERS

BACKGROUND OF THE INVENTION

1. Field of the Invention

This invention relates broadly to nondestructive testing of test members for defects. More particularly, it relates to a method and apparatus for detecting and classifying defects in test members. Such test members may consist of rod, bar, billets, tubular, sheet and plate products having flat surfaces. The method of testing may be either electromagnetic, ultrasonic, electromechanical, radiant energy, and the like, or combinations of these, in which defect detecting means produces electrical signals representative of the defects in said member.

2. Description of the Prior Art

Consumers of ferrous and nonferrous metal products make ever-increasing demands for higher and more uniform quality of products. One method used to try to meet these demands is to employ nondestructive testing equipment in quality control systems and to incorporate such systems into production facilities. However, attempts to utilize prior art testing apparatus in, for example, contemporary hot rolled steel billet or bar production facilities have led to a number of deficiencies.

For example, eddy current inspection systems are sensitive not only to surface defects but also to variations in the permeability and conductivity of the surface being inspected. For this reason scale and other harmless surface conditions on as-rolled steel can cause large output signal variations which are characterized as randomly occurring false defects and noise. Such signals are comparable to signals from relatively severe defects. Thus on as-rolled steel, especially larger sections such as billets where scale buildup increases with the section, the sensitivity to defects heretofore has been limited to those defects which were severe enough to cause a signal greater than the noise level. To achieve better defect sensitivity, prior art eddy current inspection systems have required that billets be shot blasted or pickled (descaled) so as to give more uniformity of surface conductivity and permeability. Not only are shot blasting and pickling costly, but shot blasting tends to close some defects, making them difficult or impossible to detect.

These and other types of prior art apparatus were either too insensitive or failed, because of noise, to recognize certain defects. In addition, such apparatus was too slow acting to properly detect, classify, and mark if desired, both straight and skewed defects, with equal precision and accuracy in for example billets as large as 5 inch square and larger, or those moving at high speeds as fast as 120 fpm, as well as those having only a fraction of the size or moving at a much lower rate of speed. Moreover, such apparatus would not locate defects nor classify them according to location in combination with severity and/or length, in a particular longitudinally extending section of the product, so as to facilitate improved manual or automatic reconditioning or disposal of products having defects.

SUMMARY OF THE INVENTION

One of the objects of this invention is to provide an improved method of detecting defects in test members which eliminates the requirement of shot blasting or pickling the surface of said member prior to inspection.

Another object of this invention is to provide an improved method and apparatus for detecting and locating defects in test members.

Another object of this invention is to provide said apparatus with the capacity for improving the speed of operation while inspecting test members for defects.

Another object of this invention is to provide said apparatus with the capacity for accurately and precisely detecting and locating defects in test members as large as 5 inch square and substantially larger, as well as in test members moving at speeds as fast as 120 fpm and substantially faster.

A further object of this invention is to provide said apparatus with the capacity for locating, and marking if desired, the defects and classifying said defects according to location in combination with defect severity and/or length in a particular longitudinally extending section of said test member.

Another object of this invention is to provide said apparatus with the capability of operating at an improved level of sensitivity to detect a greater number of true defects than heretofore, yet reject noise and false defect signals.

Still another object of this invention is to provide said apparatus with the capability of accommodating the detection of both straight and skewed defects.

The foregoing objects can be obtained with defect detecting, locating and/or classifying apparatus having highly sensitive defect detecting means which includes a plurality of probes adapted to scan a surface of the test member sequentially and cyclically during relative lengthwise movement therewith and for producing a plurality of electrical signals incident thereto. The plurality of electrical signals are fed to a multiplexer where they are selected sequentially for single channel processing. The selected electrical signals are fed to defect level discriminators which classify the defects according to first and second level of defect severity and produce respective defect pulses. The second level defect pulses are fed by way of a control gate to storage and marking circuits. The first level defect pulses are either transmitted by way of a control gate for further processing, or are fed through a signal correlator when noise and random false defect signals are present and/or skewed defects are to be accommodated. Correlation is done by comparing an instantaneous defect pulse with a stored pulse from a single, multiple or related fractional scanning cycle history, whereby when coincidence occurs only a first level true defect pulse is passed, thus rejecting the noise and false signals. In either case, the first level defect signals are transmitted to a plurality of section gates for classifying the defects according to length and location in a longitudinally extending section of said member where the defect occurs. A probe-driven encoder generates a synchronous sequence of scanning position pulses which operate in designation and classification circuits. These circuits generate a sequence of multiplexer gate control pulses, a control pulse for the control gates, and a sequence of section gate control pulses. Each section gate is part of a different one of a plurality of location-associated series of circuits which also include a shift register and also provide variable time delays for a range of velocities of the test member during movement between detecting and marking stations. The location-associated series of circuits also includes separate defect storage and marking circuits for each said section of the test member. Both first and second level defect pulses are utilized, for example, by a defect marking unit located downstream of the probe. One or more different colors of paint designating different levels of defect severity are applied to the test member surface at the defect location and for the length of its occurrence.

DESCRIPTION OF THE PREFERRED EMBODIMENT

Figure 1:
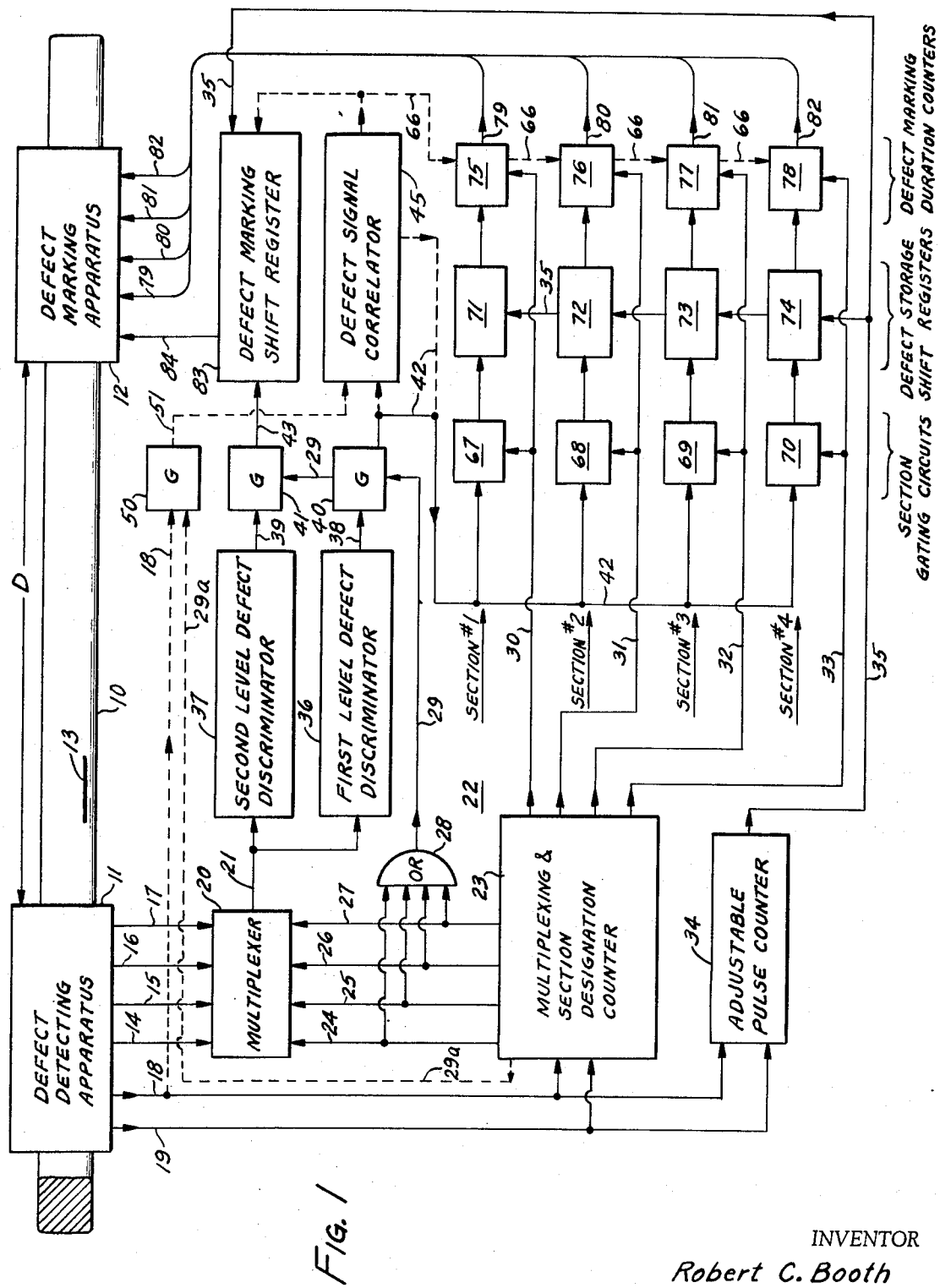
FIG. 1 is a schematic diagram showing one embodiment of the invention in, for example, the production of hot rolled steel billets.

Referring to the drawings, particularly FIG. 1, there is generally shown a continuous inspection station in, for example, the production of hot rolled steel billets 10 of up to about 5 inch square and substantially larger. Billet 10 is normally caused to move longitudinally at a constant velocity of up to about 120 fpm and substantially faster. During the course of movement billet 10 passes beneath defect detecting apparatus 11. Then, for example, it is passed through defect marking apparatus 12 which is located a known distance D downstream of the apparatus 11. Billet 10 may instead be passed through bar reconditioning and disposal equipment (not shown) which is operative in dependency upon the various defect signals produced by apparatus of this invention. For purposes of illustration, billet 10 is shown with a straight defect 13, that is, one that extends parallel to the longitudinal axis of bar 10, rather than skewed with respect to said axis.

The precision with which defects may be located by using this invention is predicated in part upon sub-dividing each flat surface of billet 10 into a predetermined number of longitudinally extending, incremental surfaces adjacent each other. To simplify defect marking these incremental surfaces are grouped into say four surface sections of billet 10. The sub-division and grouping are shown diagrammatically in FIG. 2 and are in no way limited to this arrangement.

Defect detecting apparatus 11 may be based upon any one or a combination of the aforementioned methods of nondestructive testing, provided it produces electrical signals which are representative of the defects in billet 10. One such method well suited for billet 10 quality control systems is the eddy current method which is given preference herein.

Figure 2:
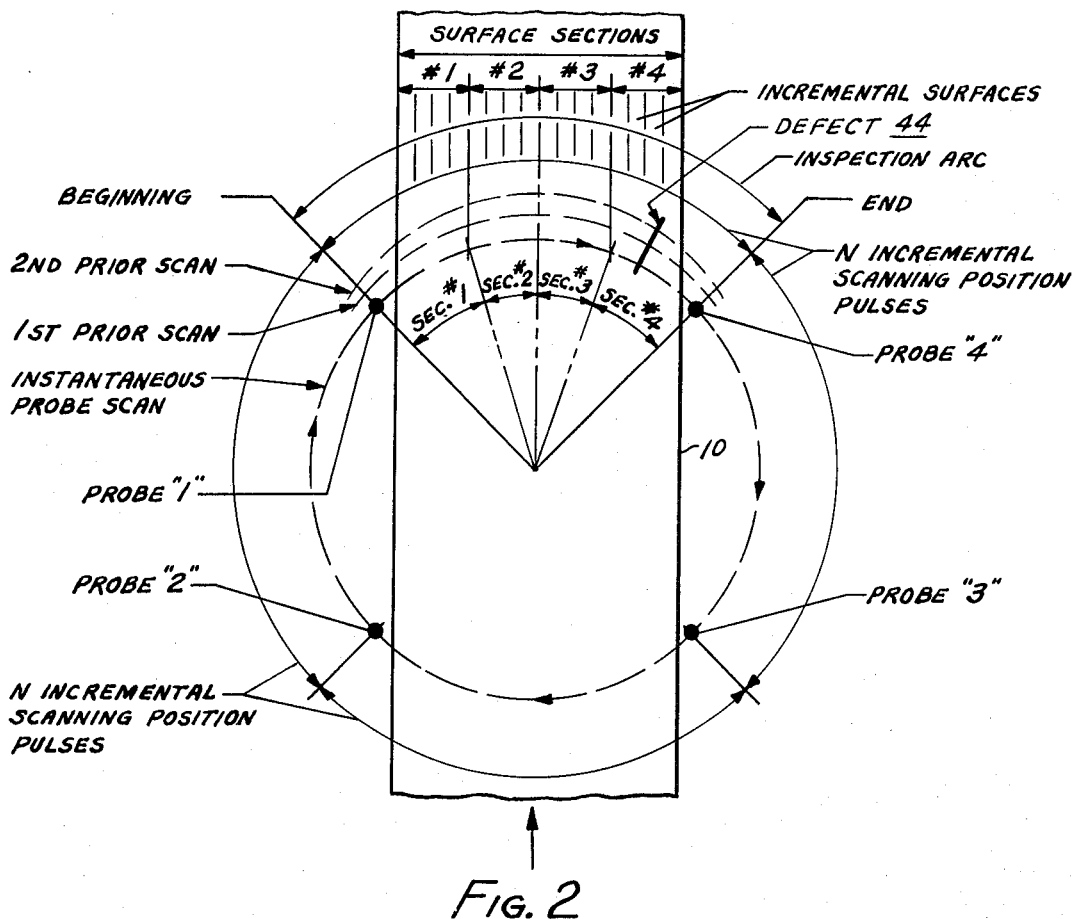
FIG. 2 is an enlarged plan view of a portion of the test billet showing diagrammatically a skewed surface defect and the pathway of the scanning probes while traversing longitudinally extending incremental surfaces of the billet.

Apparatus 11 includes defect detecting means having a motor-driven planar rotating probe assembly (not shown) adapted for cyclical scanning of a flat surface of moving billet 10. For purposes of illustration, four conventional eddy current defect detecting probes located on cross arms 90° apart and positioned close to the flat surface of billet 10 are caused to rotate parallel to said surface at a constant probe speed of about 1,200 fpm. The planar probe rotational axis is aligned perpendicularly to, and located preferably centrally across, the moving flat surface of billet 10. During rotation, the probe cross arms follow a circular pathway from side to side of said surface, and preferably beyond said sides. The probe assembly has an angular displacement of 360° per scanning cycle. However, only a portion of this angular displacement, say an arc of 90°, is used for inspection purposes and this inspection arc may be centrally located between the sides of the flat surface of billet 10. Thus, the probes scan the surface of billet 10 sequentially in the inspection arc. Refer to FIG. 2 for a diagrammatical representation of probe arrangement, scanning, inspection arc location and the sub-division of billet 10 surface into four surface sections and a plurality of adjacent incremental surfaces.

Each of the four probes are powered from within defect detecting apparatus 11 by electronic devices including respective high-gain amplifiers, each having an adjustable gain control. These controls are set to provide a high level of detector sensitivity, if desired. Thus, four separate electrical signals are produced at leads 14–17 which are representative of defects and other conditions as said probes scan the surface of billet 10. Frequently, at high levels of sensitivity the electrical signals comprise noise and randomly occurring false defects, caused by mill scale and the like, which are intermixed with true defect signals. As used herein, the term "true defects" are those which recur in the same or adjacent incremental surfaces in at least one successive scanning cycle during movement of billet 10 past the probe assembly.

Also included in defect detecting apparatus 11 is a conventional angular encoder (not shown) driven by, and in synchronism with, the scanning probes. The encoder generates a sequence of N incremental scanning position pulses per quarter scanning cycle, or 4N pulses per revolution of the probe assembly. As shown in FIG. 2, a certain portion of each N scanning position pulses have correspondence with the incremental surfaces into which billet 10 surface was sub-divided. Thus, separate scanning position pulses are provided to coordinate the occurrence of defects in each incremental surface of billet 10 with angular displacement of each different probe during its passage through the inspection arc as well as during each scanning cycle, irrespective of billet 10 width. The scanning position pulses are transmitted over lead 18 for use as will be explained below.

The encoder also generates a key pulse which starts at the beginning of a scanning cycle, endures for as long as, or longer, than one-half scanning cycle or the same as 2N incremental position pulses, and is transmitted over lead 19 for use as will also be explained below.

Referring now to both FIGS. 1 and 2, it will be apparent that the speed at which billet 10 may be inspected, i.e., passed under apparatus 11, is limited mainly by the number of probes in the probe assembly and the rotational speed of the probes. If rotational speed is maintained constant, as it is herein, then inspection speed is a function of the number of probes. According to the present example, the inspection speed is four times faster than a one-probe system. However, when more than one probe is used to scan the surface of billet 10, that number of probes may produce electrical signals simultaneously. With the probe arrangement shown in FIG. 2, first probes 1 and 3 will produce electrical signals, then 2 and 4 followed by 3 and 1, and finally probes 4 and 1, during each complete scanning cycle. If the circular pathway of the probes extended to, but not beyond the edges of billet 10, then all four probes would produce electrical signals simultaneously. For this reason, it is preferred to utilize circuit means for sequentially selecting only one of the probe outputs at a time so that single-channel electrical signal processing may be carried out to minimize the complexity of subsequent signal processing circuitry.

In the present embodiment, multiplexer 20 receives at its inputs the four different electrical signals transmitted over leads 14–17. Each of these signals are passed through an individual gating circuit which is operative under control of one of the four inspection gating pulses yet to be described. Each of the electrical signals on leads 14–17 is selected sequentially once every scanning cycle for transmission over lead 21 during the inspection arc.

The selected electrical signals are processed through classifying circuitry under control of circuit means 22 which comprises multiplexing, control gate and section selection circuitry. Included in these is multiplexing and section designation counter 23. This device includes, for example, a binary digital counter that receives the 4N incremental scanning position pulses over lead 18 during each entire scanning cycle and is provided with a plurality of preselectable outputs. The counter divides these pulses into four sequential groups which embrace the first, second, third and fourth groups of N incremental scanning position pulses, respectively. The counter is reset by associated circuitry which receives the key pulse transmitted over lead 19 and functions in response to both the leading and trailing edges of the key pulse.

As a result of these dividing and resetting actions, counter 23 generates a sequence of the four inspection gate control pulses mentioned above and these are transmitted over leads 24–27 to multiplexer 20.

Ordinarily, counter 23 generates the sequence of inspection gate control pulses so that each pulse is present only during a different adjacent group of N incremental scanning position pulses. Further, that each inspection gate control pulse endures for an entire quarter of the scanning cycle, that is, during the entire first, second, third or fourth group of N incremental scanning position pulses, and their selection is made to coincide with the beginning to the ending of the inspection arc. However, where the probes scan beyond the edges of billet 10, it may be desirable to have each of the inspection gate control pulses endure for less than an entire group of N incremental scanning position pulses. This may be only that angular portion of probe rotation and the inspection arc that could correspond to the width of billet 10 surface which is to be inspected as shown in FIG. 2. In this case, a different selection of the clock outputs in counter 23 would be made to cause a sequence of spaced narrower pulses to be transmitted over leads 24–27, respectively.

Circuit means 22 also includes OR gate 28 which receives each of the sequence of inspection gate control pulses transmitted over leads 24–27. OR gate 28 causes a control gate pulse to be transmitted over lead 29 every time an inspection gate control pulse is applied at its inputs. Thus, there is provided a control gate pulse on lead 29 for each probe while it scans the inspection arc, the endurance and spacing of which is governed by the inspection gate control pulses transmitted over leads 24–27.

The binary digital counter used in multiplexing and section designation counter 23, is tapped at appropriate outputs to divide each sequential group of N incremental scanning position pulses appearing on lead 18 into a predetermined number of sequential sections of incremental position pulses for classification purposes. This number of sections could be any value, but as shown in FIG. 2, the number is four. In response to this sub-division, designation circuitry within counter 23 causes the generation of a sequence of four section gate control pulses for each group of N incremental scanning position pulses.

In other words, the sequence of four section gate control pulses are generated four times per scanning cycle. Each of the sequence of gate control pulses is transmitted over respective leads 30–33 and is present only during one of the four different adjacent sections within the inspection arc. Each section gate control pulse may endure for the same number of incremental scanning position pulses. Or, for example, the first and fourth section pulses may endure longer than the second and third section pulses. In the latter case, a defect may be located more precisely due to the necessity to translate rotary motion of the probe into linear displacement of the incremental surfaces laterally across the entire surface of billet 10 to be inspected. Actual endurance of section gate control pulses is determined by which of the outputs of the binary clock is counter 23 are selected for this purpose.

Circuit means 22 also includes adjustable pulse counter 34 which is responsive to the scanning position pulses and the key pulse transmitted over leads 18,19, respectively. Counter 34 also includes a resetable binary digital counter and generates a shift pulse on lead 35 approximately once every scanning cycle for use as will be described below. Counter 34 has a plurality of output taps for providing a preselectable choice of time delays which correspond to one of a number of predetermined velocities of billet 10 movement. Thus, compensation is provided for differences in billet 10 length per scan for each probe while maintaining a fixed distance D between detection and marking stations.

Still referring to FIG. 1, the selected electrical signals transmitted over lead 21 from multiplexer 20 are fed to as many defect signal detecting means as may be desired. In the embodiment shown, these means consist of first and second level defect discriminators 36 and 37, respectively. Such levels may have correspondence with reworkable and rejectable levels of defect severity, or other levels as desired, where the first level is the lowest order of magnitude. Discriminators 36,37 produce first and second level defect pulses, respectively, whenever any of the electrical signals over lead 14 differ from at least one predetermined waveform associated with each level of the two levels of defects to be detected.

In applications where recognition of the predetermined waveforms are relatively simple, such as determining excesses of the electrical signal over given but different amplitudes, then discriminators 36,37 may consist of level detectors each operating against an internal reference source adjusted to their given amplitude. Where recognition patterns are more difficult, such as determining both differences in amplitude and waveform duration, then discriminators 36,37 may consist of waveform analyzers, or include both level detectors and pulse width discriminators operating against respective reference sources adjusted to predetermined values thereof. Regardless of their form, it is contemplated that discriminators 36,37 will produce first and second level defect pulses at leads 38,39 respectively, whenever any of the electrical signals transmitted over lead 21 exceeds the aforesaid predetermined levels of defect severity.

In order that the plurality of electrical signals produced by the plurality of probes may be processed only during the inspection arc, that is, only during each probe's first movement across the entire surface of billet 10 as compared to the entire scanning cycle, and in order to maintain a proper frame of reference for defects detected in the inspection arc but in no other part of the scanning cycle, gating circuits 40,41 are provided to control the transmission of first and second level defect pulses over leads 38,39 to leads 42,43 respectively, in response to the control gate pulse transmitted over lead 29 to gates 40,41.

Ordinarily, the first level defect pulses are transmitted over lead 42 to section gates described below when the electrical signals on lead 21 are relatively free of electrical noise and false defect signals. The latter signals are generally of equal magnitude and intermixed randomly with true defect signals. However, when false defect signals are present, or when billet 10 has a skewed defect 44, such as is shown in FIG. 2, or billet 10 moves slightly laterally while passing beneath defect detecting apparatus 11, then the defect signal correlator 45 shown in FIG. 3 is incorporated into the FIG. 1 embodiment and first level defect pulses are fed to it from discriminator gate 40 (shown dotted in FIG. 1 and solid in FIG. 3).

Figure 3:
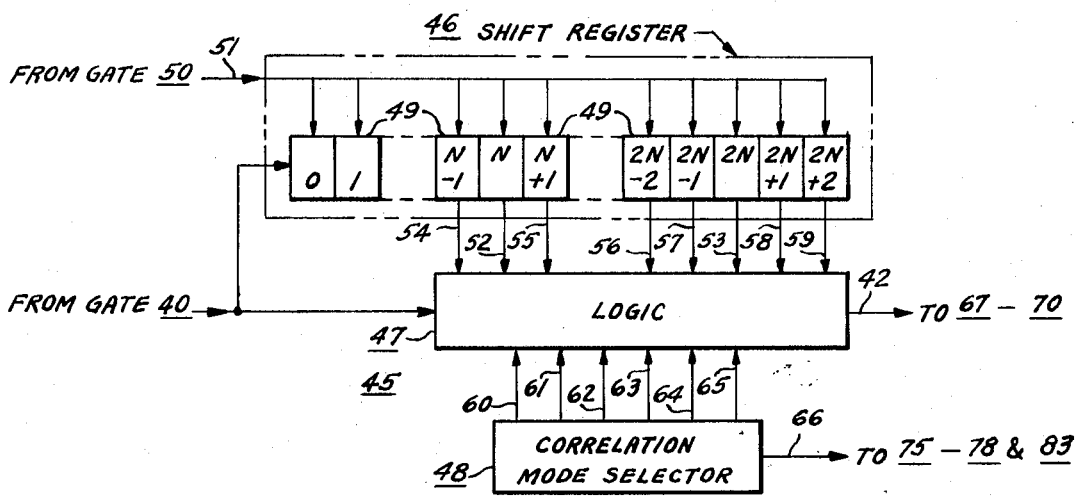
FIG. 3 is a block diagram of a signal correlator utilized in the embodiment shown in FIG. 1.

Referring to FIG. 3, defect signal correlator 45 preferably is the type disclosed in the copending application of John P. Hoffman and Robert C. Booth, Ser. No. 816,709, filed on Apr. 16, 1969, now U.S. Pat. No. 3,609,683 and entitled "Electronic Signal Correlating Apparatus," excluding the analog signal detecting means shown therein which corresponds with discriminator 36 herein. Briefly, correlator 45 includes shift register 46, control logic 47 and correlation mode selector 48. These circuits receive the first level defect pulses from gate 40 and operate to separate and pass true first level defect pulses over lead 42 and reject the other pulses. Correlation takes place whenever coincidence occurs as a result of a comparison between a recurring instantaneous true defect pulse and a stored true defect pulse from either the same, or a leading or lagging increment of a single, multiple or related fractional cycle of probe scanning history. In this manner, correlator 45 not only rejects noise and false defect signals with precision and accuracy but also accommodates straight defects 13 as well as skewed defects 44.

Shift register 46 is constructed, for example, of a predetermined number of serially-connected binary storage stages 49, each consisting of an integrated circuit type of device having a shift circuit activated by scanning position pulses. However, in order to maintain the above-noted frame of reference, the scanning position pulses transmitted over lead 18 must first pass through gating circuit 50 (shown in FIG. 1). This gate operates in response to gate control pulses generated within multiplexing and section designation counter 23 similarly to pulses on lead 29, except that they endure for the entire inspection arc, rather than possibly only a part of it. These gating pulses are transmitted over lead 29a. Thus, gated scanning position pulses function as shifting pulses and are transmitted over lead 51 to the plurality of shifting circuits in shift register 46.

Shift register 46 comprises stage O and M sections of at least N stages 49 per section, plus additional incremental stages as noted below. Stage O, or a setting stage, is located at shift register 46 input circuit and receives the instantaneous first level true and false defect pulses fed from gate 40. These pulses generally occur somewhere within one of the incremental scanning position pulses and stage O stores them temporarily, that is for the remainder of said incremental pulse, before transferring them to subsequent stages in response to the shifting pulses on lead 51.

The number of M sections of shift register 46 corresponds to a predetermined number of prior cycles, or history, of defect pulses occurring in the inspection arc that are to be stored. N corresponds to a predetermined maximum number of incremental position pulses per group at lead 18. This also corresponds to the maximum number of incremental surfaces into which billet 10 surface may be sub-divided. The actual numerical value of both M and N is governed by the degree of reliability and precision of signal correlation that is to be achieved, there being practical limitations for both values. For example, the larger M is made, the greater the number of first level defect pulses that become involved in determining whether the pulse is true or false, thus increasing the reliability of such determination. Further, the larger N is made, the greater number of longitudinally extending surface increments there are in every inspection arc portion of the scanning cycle. This increases the precision with which a true defect can be located in a given historical cycle, and correspondingly the location in a longitudinally extending surface of billet 10.

Shift register 46 includes a number of output circuits which provide for several degrees of reliability of operation as well as for accommodating leading and lagging true and false first level defect pulses in successive scanning cycles with regards to both straight and skewed defects 13, 44. These output circuits are derived by tapping the output of one or more preselected stages 49. In its simplest form, shift register 46 consists of one section of N stages per section and stage N output is fed to circuit 52. For greater reliability, two sections of N stages per section are provided with stages N and 2N outputs fed to respective circuits 52, 53, and so on. To accommodate leading and lagging, or skewed, true and false first level defect pulses in a one-section shift register 25, an additional stage 49 must be added and stages N, N−1 and N+1 outputs fed to respective circuits 52, 54 and 55. In a two-section shift register 46, two additional stages 49 should be added and stages N, N−1, N+1, 2N, 2N−2, 2N−1, 2N+1 and 2N+2 outputs fed to respective circuits 52, 54, 55, 53, 56, 57, 58 and 59. It will be apparent that a correlator with the greater versatility would be the latter embodiment. For this reason and purposes of illustration the shift register 46 shown in FIG. 3 includes 2N+2 stages.

After true and false first level defect pulses enter stage O, they are transferred incrementally through successive stages in response to the shifting pulses at lead 51 which are applied simultaneously to the shift circuit of each stage 49. Pulse transfer continues until each pulse is passed out of the last stage in shift register 46. Shifting occurs at the negative-going, or trailing, edge of the shifting pulses.

Circuit means operating under one of a number of correlating modes is provided for enabling the comparison of discriminator 36 output by way of enabled gate 40 with one or more shift register outputs at leads 52–59. This circuit means passes true first level defect pulses when coincidence occurs between an instantaneous and a stored true first level defect pulse under one of the number of correlating modes explained below. Random false first level defect pulses are rejected for the lack of coincidence with another false defect pulse.

The above-mentioned circuit means includes control logic means 47 operating under control of correlation mode selector means 48. Control logic means 47 consists of a plurality of NAND gates which are circuited to receive instantaneous true and false first level defect pulses from gate 40 and stored true and false first level defect pulses over circuits 52–59. These NAND gates inhibit the passage of all pulses until enabled in one or more combinations by one or more correlation mode selection signals received from selector means 48.

Although there are many possible correlating modes that can be derived, only six have been chosen for illustrative purposes for which selector 48 produces corresponding correlation mode selection signals. These signals are fed over leads 60–65 to the NAND gates in control logic means 47. The signal on lead 60 enables correlator 45 to be by-passed, if desired, so that first level pulses received from gate 40 are immediately transmitted on lead 42. The signals on leads 61–65 enable a comparison between discriminator 36 output by way of enabled gate 40 and one group of shift register 46 outputs at either N stage, 2N stage, N and N±1 stages, 2N and 2N±1 stages, or 2N, 2N±1, and 2N±2 stages, respectively. As a result of said comparison, a true first level defect pulse is passed by control logic means 47 over lead 42 to section gates described below, whenever coincidence occurs between a recurring instantaneous and a stored true first level defect pulse from either the same or a leading or lagging increment of a single, multiple or related fractional cycle of scanning history.

Correlation mode selection means 48 also provides signals over lead 66 to circuits yet to be described for identifying the correlating mode of first level defect pulses appearing at lead 42.

The gated first level defect pulses are fed over lead 42 to each of a plurality of section classification circuits, more specifically, to the input side of each section gating circuit 67–70. These gates operate sequentially under control of the section gate control pulses fed over leads 30–33, respectively, and pass only those defect pulses which correspond to defects occurring in its respective section of billet 10 surface.

The outputs from section gates 67–70 are fed to the input side of section defect storage shift registers 71–74, respectively. Each of these shift registers consists of a series of binary storage stages similar in construction and operation to that of shift register 46, except that registers 71–74 receive the shift pulse transmitted over lead 35, rather than over lead 51. Thus, a first level defect pulse is transferred from stage-to-stage approximately every revolution of the scanning probe. One other feature of this arrangement is that the incremental surface orientation section of a defect in billet 10 is dependent upon probe position, rather than on billet 10 velocity.

Outputs from defect storage shift registers 71–74 are connected to the inputs of marking duration counters 75–78 when it is desired to store a first level defect pulse for a period longer than say the duration between scanning incremental position pulses. It may be desirous to use such stored pulses in, for example, defect marking or other kinds of circuits. Each counter 75–78 includes a binary pulse counter which is set when a first level defect pulse appears at their respective inputs and is clocked by a section gate control pulse transmitted over leads 30–33, respectively. As long as defect pulses are present at their inputs the respective counters 75–78 will produce a section defect pulse at their respective output leads 79–82.

Each counter 75–78 is arranged to reset itself and terminate the section defect pulse after the last defect pulse is received, except when correlator 45 is incorporated into the defect detecting and classifying apparatus. In this case, each counter 75–78 is modified to respond to the correlation mode identification signals transmitted over lead 66 (as shown by dotted line in FIG. 1), so as to reset itself after as many scanning cycles as were selected for defect signal correlation. Each section defect pulse appearing at leads 79–82 may be utilized for marking or other purposes as described below.

Still referring to FIG. 1, the gated second level defect pulses transmitted over lead 43 are fed directly to defect marking shift register 83 which is constructed substantially the same as shift registers 71–74. Shift register 83 is clocked by the shift pulse transmitted over lead 35 so as to be responsive over an entire scanning cycle, rather than in only one section as shift registers 71–74. The second level defect pulses processed by shift register 83 appear at lead 84.

Both first and second level defect pulses appearing at leads 79–82 and 84 may be utilized to activate defect marker apparatus, to control automatic billet reconditioning and/or disposal equipment, or to drive computerized defect analysis or control equipment, indicators, recorders and the like. For purposes of illustration herein, these pulses are transmitted to a plurality of defect marker units (not shown) in defect marking apparatus 12. Each marker unit may, for example, consist of a solenoid operated paint sprayer located in a lateral plane perpendicular to billet 10 and be activated in response to one of the defect pulses. Such marker units may be grouped into first and second predetermined numbers thereof, each group capable of spraying a different color of paint to mark classified defects according to level of severity. For instance, yellow paint may be used for the first group and red paint for the second group to signify first and second levels of defect severity, respectively.

In one marking arrangement, the first group of marker units includes four markers with yellow paint, one located in each section above billet 10 surface. These markers are responsive to section defect pulses transmitted over leads 79–82 to mark billet 10 according to defect location in one of the longitudinally extending sections of billet 10 surface. This arrangement also marks billet 10 according to defect severity (yellow), and length for at least the number of quarter-scanning cycles the defect was existent.

In a second marking arrangement, the second group of marker units are added to the first arrangement and consist of a single marker unit with red paint, located say between the second and third section, that are responsive to the second level defect pulse transmitted over lead 84.

In a third marking arrangement, the second marking arrangement is modified whereby each marker unit in the first group of marker units is responsive to the second level defect pulse transmitted over lead 84, instead of the separate pulses transmitted over leads 79–82.

In a fourth marking arrangement, the second marking arrangement is modified whereby each marker unit in the first group of marker units is responsive to both the first and second level defect pulses transmitted over leads 79–82 and 84.

In a fifth marking arrangement, the second group of marker units are added to the marker units of the first arrangement and consist of four marker units with red paint located adjacent those with yellow paint. In this arrangement, the four marker units in the first group are responsive to the defect pulses transmitted over leads 79–82 only when there was no pulse at lead 84, and the second group are responsive to the defect pulses transmitted over leads 79–84 only when there was a pulse at lead 84.

As can be appreciated from the foregoing discussion numerous possible marking arrangements exist with which defects may be classified according to location, level of severity and/or length in a section of billet 10 surface. Generally, the selection of a marking arrangement in practice is governed by the type of marking used in subsequent manufacturing operations, or by personnel operating the manufacturing facility.

OPERATION

In operation, when each of the scanning probes (not shown) detects straight defect 13 in the surface of billet 10, then a plurality of electrical signals are transmitted over leads 14–17 to multiplexer 20, where each of these electrical signals are selected sequentially one at a time for passage to discriminators 36,37. Assume that defect 13 was several quarter-scanning cycles long and that it exceeded the first but not the second level of defect severity. Further, that the defect signal was sufficiently free of noise and false defect content that correlator 45 was not required. Then, discriminator 37 will not become activated, but discriminator 36 will produce a first level defect pulse each time one of the probes detects defect 13. Each such defect pulse is transmitted sequentially via lead 38 to enable gate 40 and over lead 42 to the input of each section gating circuit 67–70. If defect 13 occurred in say the fourth section of billet 10 surface, then the sequence of section gate control pulses for the first three sections that are fed over leads 45–47 during the quarter-scanning cycle of each probe will have been generated and ceased without classifying any defect pulses through section gates 67–69.

When the last section gate control pulse is generated in each quarter-scanning cycle and fed over lead 33, section gate 70 will be enabled to pass all defect signals representing defects located in the fourth section of billet 10 surface during each quarter-scanning cycle. Each first level defect pulse representing defect 13 which is detected by each probe will then enter shift register 74 in their scanning sequence and will be transferred through successive stages spaced one quarter-scanning cycle apart. After a predetermined number of scanning cycles, which are determined by the setting of adjustable pulse counter 34 and related to the velocity of billet 10 and distance D, the first occurring first level defect pulse sets defect marking duration counter 78. This activates the yellow paint spraying defect marker unit which is responsive to the pulse that appears at lead 82. This marker unit will remain activated until counter 78 is reset as described above, that is, until after the last quarter-scanning cycle in which a defect pulse is produced in the fourth section by one of the probes.

Defects occurring in other sections of billet 10 will produce defect pulses that will be processed only through their respective series of classifying circuits. Their sectional marker units will operate in a manner similar to that described above, either independently if a defect occurs in another section, or sequentially if one or more defects occur in one or more sections.

If defect 13 had exceeded the second level of defect severity, then both discriminators 36,37 would have produced first and second level defect pulses, respectively. Each of the first level defect pulses will be processed as described above whereby the fourth section yellow paint spraying marker unit is activated in each quarter-scanning cycle that the defect occurred. In addition, the first occurring second level defect pulse sets shift register 83 and later activates the red paint spraying defect marker unit in apparatus 12 which is responsive to the pulse that appears at lead 84.

When the characteristics of the electrical signals transmitted over lead 21 from multiplexer 20 are such as to include electrical noise, or random false defects having a magnitude greater than the first level of defect severity, then correlator 45 is incorporated as described above. During each quarter-scanning cycle, the true first level defect pulse produced by discriminator 36 is inserted in the O, or setting, stage of shift register 46 from the output of control gate 40. Shifting of this pulse through register 46 is caused by the scanning position pulses on lead 18 which pass through gate 50 to lead 51. The beginning and ending of this shifting is under control of the control gate pulse on lead 29a. One quarter-scanning cycle later this pulse will have advanced through the incremental stage to the N stage. If the N correlating mode is established by selector 48, then the pulse state of the N storage stage is compared with the instantaneous pulse state of control gate 40 output, said comparison being performed in logic means 47. When coincidence occurs, a true first level defect pulse is transmitted over lead 42 and the false defect signals are rejected. Defect classifying and marking will take place as described above.

Alternatively, if the 2N correlating mode is established by selector 48, then the comparison of true defects detected is made in two quarter-scanning cycles. The first occurring true first level defect pulse advance from O stage to the N stage in the first quarter-scanning cycle and from the N stage to the 2N stage in the second quarter-scanning cycle. The second occurring true defect pulse advances from O stage to the N stage in the second quarter-scanning cycle. Then the pulse state of the N and 2N storage stages are compared with the instantaneous state of control gate 40 in logic means 47. When coincidence occurs, a true first level defect pulse is transmitted over lead lead 42 and the false defect signals are rejected. Defect classifying and marking will take place as described above.

The possibility exists that billet 10 may be manufactured with a skewed defect 44, or that a billet with a straight defect 13 may move slightly laterally during passage under defect detecting apparatus 11. To accommodate these conditions, correlator 45 is incorporated as described above and is provided with correlating mode selector 48 capable of being set to correlate the first level defect pulses with the first prior quarter-scanning cycle for N or N±1 incremental surface positions, or to correlate the first level defect pulses with the second prior quarter-scanning cycle for 2N, 2N±1 or 2N±2 incremental surface positions.

For an example of defect pulses correlation under either of these conditions, refer to FIG. 2 and assume that during the first quarter-scanning cycle (labeled second prior scan) skewed defect 44 is detected in say the last incremental surface position in the fourth section. If the instantaneous quarter!-scanning cycle in which defect 44 is to be considered for correlation is either the second or third occurring quarter-scanning cycle (labeled first prior scan and instantaneous scan, respectively), then defect 44 is detected in either one or two incremental surface positions leading the position of defect detection in the first quarter-scanning cycle. Comparison of the instantaneous pulse state of control gate 40 with the pulse states of the respective storage stages N, 2N, etc., under one of the above mentioned correlating modes is performed in logic means 47 in the manner described above. When coincidence occurs, a true first level defect pulse is transmitted over lead 42, the false defect signals being rejected, even though the true defect occurred in one, or two, leading incremental surfaces in successive quarter-scanning cycles. Defect classifying and marking will take place as described above.

If skewed defect 44 should extend from the fourth section of billet 10 into its third section, defect correlation, classifying and marking will occur as described above with defect marking taking place first in the fourth section and then in the third section of billet 10 when the defect is detected therein.

Thus, it can be seen that by using the multi-probe inspection method and apparatus of this invention, defects may be detected in products having flat surfaces which are capable of moving at substantially increased speeds over one-probe methods and apparatus; that defect detection may occur at improved levels of sensitivity and with improved accuracy and reliability; that by means of electronic processing true defects may be separated from noise and false defects and both straight and skewed defects may be accommodated; that detected defects may be located, and marked if desired, more precisely than heretofore; and that detected defects may be classified not only by location, but in combination with defect severity and/or length.

I claim:

1. Method of detecting and locating defects in a member, comprising:
   a. scanning a surface of said member for defects using a plurality of probes positioned close to said surface, each probe capable of scanning a different portion of said surface sequentially, said probes producing a corresponding plurality of electrical signals representing defects detected in respective portions of said member,
   b. generating a sequence of scanning position pulses in synchronism with said scanning, said pulses having correspondence with the location of adjacent increments of the surface scanned,
   c. sequentially selecting one of said plurality of electrical signals at a time in response to the scanning position pulses, thus enabling the selected electrical signals to be processed only when their associated probe scans a predetermined portion of said surface,
   d. passing the selected electrical signals through circuit means to produce defect pulses whenever any of said selected electrical signals differ from at least one predetermined waveform, and further processing said defect pulses solely under control of said scanning position pulses, and
   e. utilizing only the defect pulses and the scanning position pulses to locate defects detected in each different portion of said member.

2. Method of detecting and locating defects in a member, comprising:
   a. scanning a surface of said member for defects using a plurality of probes, each probe capable of scanning a different portion of said surface sequentially, said probes producing a corresponding plurality of electrical signals representing true and randomly occurring false defects detected in respective portions of said member,
   b. generating scanning position pulses in synchronism with said scanning, said pulses having correspondence with the location of adjacent increments of the surface scanned,
   c. sequentially selecting one of said plurality of electrical signals at a time in response to the scanning position pulses, thus enabling the selected electrical signals to be processed only when their associated probe scans a predetermined portion of said surface,
   d. passing the selected electrical signals through circuit means to produce true and randomly occurring false defect pulses whenever any of said selected electrical signals differ from at least one predetermined waveform,
   e. processing the true and false defect pulses through circuit means to pass only the true defect pulses and reject said false defect pulses, and
   f. utilizing the true defect pulses and the scanning position pulses to locate only true defects detected in each different portion of said member.

3. Method of detecting and locating defects in a member, comprising:
   a. scanning a surface of said member for defects using a plurality of probes, each probe capable of scanning a different portion of said surface sequentially and cyclically, said probes producing a corresponding plurality of electrical defect pulses representing defects detected in respective portions of said member,
   b. generating a cyclic sequence of scanning position pulses in synchronism with said scanning, said pulses having correspondence with the locations of adjacent increments of the surface scanned,
   c. sequentially selecting one of said plurality of electrical signals at a time in response to the scanning position pulses, thus enabling the selected electrical signals to be processed only when their associated probe scans a predetermined portion of said surface,
   d. passing the selected electrical signals through circuit means to produce defect pulses whenever any of said selected electrical signals differ from at least one predetermined waveform,
   e. processing said defect pulses through circuit means in response to the scanning position pulses to correlate the coincidence of an instantaneous defect pulse with a stored defect pulse from one or more previous scanning cycles in order to pass said defect pulses, said stored pulse occurring in either the same, a leading or a lagging incremental surface position in the previous scanning cycle, and
   f. utilizing the processed defect pulses and the scanning position pulses to locate either a straight or a skewed defect detected in one or more different portions of said member.

4. The method of claim 3 wherein the defect pulses are processed through correlating circuitry in order to be passed on for subsequent usage.

5. Method of detecting defects in a member and classifying said defects according to severity and location, comprising:
   a. scanning a surface of said member for defects using a plurality of probes positioned close to said surface, each probe capable of scanning a different portion of said surface sequentially, said probes producing a corresponding plurality of electrical signals representing defects detected in said member,
   b. generating scanning position pulses in synchronism with said scanning, said pulses having correspondence with the location of adjacent increments of the surface scanned,
   c. sequentially selecting one of said plurality of electrical signals at a time in response to the scanning position pulses, thus enabling the selected electrical signals to be processed only when their associated probe scans a predetermined portion of said surface,
   d. passing the selected electrical signals through circuit means to produce a plurality of different kinds of defect pulses, each kind representing a different defect severity, whenever any of said selected electrical signals differ from at least one predetermined waveform associated with each kind of defect severity, and further processing one kind of said defect pulses solely under control of said scanning position pulses, and e. utilizing only the plurality of defect pulses and the scanning position pulses to classify defects detected in each different portion of said member according to severity and location.

6. Method of detecting defects in a member and classifying said defects according to location and length, comprising:
   a. scanning a surface of said member using a plurality of probes, each probe capable of scanning a different portion of said surface sequentially and cyclically, said probes producing a corresponding plurality of electrical defect pulses representing defects detected in respective portions of said member,
   b. generating a cyclic sequence of scanning position pulses in synchronism with said scanning, said pulses having correspondence with the locations of adjacent increments of the surface scanned,
   c. sequentially selecting one of said plurality of electrical signals at a time in response to the scanning position pulses, thus enabling the selected electrical signals to be processed only when their associated probe scans a predetermined portion of said surface,
   d. passing the selected electrical signals through circuit means to produce defect pulses whenever any of said selected electrical signals differ from at least one predetermined waveform,
   e. processing the defect pulses through circuit means in response to the scanning position pulses to pass said defect pulses which recur in a predetermined portion of one or more scanning cycles, and
   f. utilizing the processed defect pulses and the scanning position pulses to classify defects detected in each different portion of said member according to severity and length, the latter being based on recurrence of said defect in a plurality of scanning cycles.

7. Method of detecting defects in a member and classifying said defects according to severity, location and length, comprising:
   a. scanning a surface of said member for defects using a plurality of probes, each probe capable of scanning a different portion of said surface sequentially and cyclically, said probes producing a corresponding plurality of electrical signals representing defects detected in respective portions of said member,
   b. generating a cyclic sequence of scanning position pulses in synchronism with said scanning, said pulses having correspondence with the locations of adjacent increments of the surface scanned,
   c. sequentially selecting one of said plurality of electrical signals from said probes in response to the scanning position pulses, thus enabling the selected electrical signals to be processed only when their associated probe scans a predetermined portion of said surface,
   d. passing the selected electrical signals through circuit means to produce a plurality of different kinds of defect pulses, each kind representing a different defect severity, whenever any of said selected electrical signals differ from at least one predetermined waveform associated with each kind of defect severity,
   e. processing at least one of the kinds of defect pulses through circuit means in response to the scanning position pulses to pass said defect pulses which recur in a predetermined portion of one or more scanning cycles, and
   f. utilizing the processed and unprocessed defect pulses and the scanning position pulses to classify defects detected in one or more portions of said member according to severity, location and length, the latter being based on recurrence of said defect in a plurality of scanning cycles.

8. Method of detecting defects in a member and marking defect locations on a surface of said member, comprising:
   a. scanning a surface of said member for defects using a plurality of probes positioned close to said surface, each probe capable of scanning a different portion of said surface sequentially, said probes producing a corresponding plurality of electrical signals representing defects detected in respective portions of said member,
   b. generating scanning position pulses in synchronism with said scanning, said pulses having correspondence with the location of adjacent increments of the surface scanned,
   c. sequentially selecting one of said plurality of electrical signals at a time in response to the scanning position pulses, thus enabling the selected electrical signals to be processed only when their associated probe scans a predetermined portion of said surface,
   d. passing the selected electrical signals through circuit means to produce defect pulses whenever any of said selected electrical signals differ from at least one predetermined waveform, further processing said defect pulses solely under control of said scanning position pulses, and
   e. utilizing only the defect pulses and the scanning position pulses to locate defects detected in each different portion of said member, and
   f. marking the location of said defects detected on one or more incremental surfaces of said member.

9. Apparatus for detecting and locating defects in a member, comprising:
   a. defect detecting means including a plurality of probes adapted to be positioned close to and scan a surface of said member, each probe capable of scanning a different portion of said surface sequentially, for producing a plurality of electrical signals representing defects detected in respective portions of said member,
   b. means including an encoder synchronized with probe scanning for generating a sequence of scanning position pulses having correspondence with the location of adjacent increments of the surface scanned,
   c. circuit means for sequentially selecting one of said plurality of electrical signals at a time in response to said scanning position pulses, thereby enabling the selected electrical signals to be processed only when their associated probe scans a predetermined portion of said surface,
   d. circuit means responsive to the selected electrical signals for producing defect pulses whenever any of said selected electrical signals differ from at least one predetermined waveform, said circuit means adapted to further process said defect pulses solely under control of the scanning position pulses and
   e. circuit means for utilizing only the defect pulses and the scanning position pulses to locate defects detected in each different portion of said member.

10. Apparatus for detecting and locating defects in a member comprising:
   a. defect detecting means including a plurality of probes adapted to scan a surface of said member, each probe capable of scanning a different portion of said surface sequentially for producing a plurality of electrical signals representing true and randomly occurring false defects detected in respective portions of said member,
   b. means including an encoder synchronized with probe scanning for generating scanning position pulses having correspondence with the location of adjacent increments of the surface scanned,
   c. circuit means for sequentially selecting one of said plurality of electrical signals at a time in response to said scanning position pulses, thereby enabling the selected electrical signals to be processed only when their associated probe scans a predetermined portion of said surface,
   d. circuit means responsive to the selected electrical signals for producing true and randomly occurring false defect pulses whenever any of said selected electrical signals differ from a predetermined waveform,
   e. circuit means for processing the true and false defect pulses so as to pass only the true defect pulses and reject said false defect pulses, and f. circuit means for utilizing the true defect pulses and the scanning position pulses to locate only true defects in each different portion of said member.

11. Apparatus for detecting and locating defects in a member, comprising:
   a. defect detecting means including a plurality of probes adapted to scan a surface of said member, each probe capable of scanning a different portion of said surface sequentially and cyclically, for producing a plurality of electrical signals representing defects detected in respective portions of said member,
   b. means including an encoder synchronized with probe scanning for generating a cyclic sequence of scanning position pulses having correspondence with the location of adjacent increments of the surface scanned,
   c. circuit means for sequentially selecting one of said plurality of electrical signals at a time in response to said scanning position pulses, thereby enabling the selected electrical signals to be processed only when their associated probe scans a predetermined portion of said surface,
   d. circuit means responsive to the selected electrical signals for producing defect pulses whenever any of said selected electrical signals differ from at least one predetermined waveform,
   e. circuit means for processing the defect pulses in response to the scanning pulses, said means correlating the coincidence of an instantaneous defect pulse with a stored defect pulse from one or more previous scanning cycles in order to pass said defect pulses, said stored pulse occurring in either the same, a leading or a lagging incremental surface position in the previous scanning cycles, and
   f. circuit means for utilizing the processed defect pulses and the scanning position pulses to locate either a straight or a skewed defect detected in each different portion of said member.

12. The apparatus of claim 11 wherein said circuit means (e) includes:
   a. signal correlating means responsive to said defect pulses and said scanning position pulses for determining the coincidence of said instantaneous and stored pulses.

13. Apparatus for detecting defects in a member and classifying said defects according to severity and location, comprising:
   a. defect detecting means including a plurality of probes adapted to be positioned close to and scan a surface of said member, each probe capable of scanning a different portion of said surface, sequentially, for producing a plurality of electrical signals representing defects detected in respective portions of said member,
   b. means including an encoder synchronized with probe scanning for generating a sequence of scanning position pulses having correspondence with the location of adjacent increments of the surface scanned,
   c. circuit means for sequentially selecting one of said plurality of electrical signals at a time in response to said scanning position pulses, thereby enabling the selected electrical signals to be processed only when their associated probe scans a predetermined portion of said surface,
   d. circuit means responsive to the selected electrical signals for producing a plurality of different kinds of defect pulses, each kind representing a different defect severity, whenever any of said selected electrical signals differ from at least one predetermined waveform associated with each kind of defect severity, said circuit means adapted to further process one kind of said defect pulses solely under control of the scanning position pulses and
   e. circuit means for utilizing only the plurality of defect pulses and the scanning position pulses to classify the defects detected in each different portion of said member according to severity and location.

14. Apparatus for detecting defects in a member and classifying said defects according to location and length, comprising:
   a. defect detecting means including a plurality of probes adapted to scan a surface of said member, each probe capable of scanning a different portion of said surface sequentially and cyclically, for producing a plurality of electrical signals representing defects detected in respective portions of said member,
   b. means including an encoder synchronized with probe scanning for generating a cyclic sequence of scanning position pulses having correspondence with the location of adjacent increments of the surface scanned,
   c. circuit means for sequentially selecting one of said plurality of electrical signals at a time in response to said scanning position pulses, thereby enabling the selected electrical signals to be processed only when their associated probe scans a predetermined portion of said surface,
   d. circuit means responsive to the selected electrical signals for producing defect pulses whenever any of said selected electrical signals differ from at least one predetermined waveform,
   e. circuit means for processing said defect pulses in response to the scanning position pulses so as to pass said defect pulses which recur in a predetermined portion of one or more scanning cycles, and
   f. circuit means for utilizing the processed defect pulses and the scanning position pulses to classify defects detected in each different portion of said member according to severity and length.

15. Apparatus for detecting defects in a member and classifying said defects according to severity, location and length, comprising:
   a. defect detecting means including a plurality of probes adapted to scan a surface of said member, each probe capable of scanning a different portion of said surface sequentially and cyclically for producing a plurality of electrical signals representing defects detected in respective portions of said member,
   b. means including an encoder synchronized with probe scanning for generating a cyclic sequence of scanning position pulses having correspondence with the location of adjacent increments of the surface scanned,
   c. circuit means for sequentially selecting one of said plurality of electrical signals at a time in response to said scanning position pulses, thereby enabling the selected electrical signals to be processed only when their associated probe scans a predetermined portion of said surface,
   d. circuit means responsive to the selected electrical signals for producing a plurality of different kinds of defect pulses, each kind representing a different defect severity, whenever any of said selected electrical signals differ from at least one predetermined waveform associated with each kind of defect severity,
   e. circuit means for processing at least one of the kinds of defect pulses in response to the scanning position pulses so as to pass said one kind of defect pulses which recur in a predetermined portion of one or more scanning cycles, and
   f. circuit means for utilizing the processed and unprocessed defect pulses and the scanning position pulses to classify the defects detected in each different portion of said member according to severity, location and length.

16. Apparatus for detecting defects in a member and marking defect locations on a surface of said member, comprising:
   a. defect detecting means including a plurality of probes adapted to be positioned close to and scan a surface of said member, each said probe capable of scanning a different portion of said surface sequentially, for producing a plurality of electrical signals representing defects detected in respective portions of said member, b. means including an encoder synchronized with probe scanning for generating a sequence of scanning position pulses having correspondence with the location of adjacent increments of the surface scanned, c. circuit means for sequentially selecting one of said plurality of electrical signals at a time in response to said scanning position pulses, thereby enabling the selected electrical signals to be processed when their associated probe scans a predetermined portion of said surface at any one time, d. circuit means responsive to the selected electrical signals for producing defect pulses whenever any of said selected electrical signals differ from at least one predetermined waveform, said circuit means adapted to further process said defect pulses solely under control of the scanning position pulses.

e. circuit means for utilizing only the defect pulses and the scanning position pulses to locate defects detected in each different portion of said member, and f. means for marking the location of said defects detected on one or more incremental surfaces of said member.

17. The method of claim 2 wherein the plurality of electrical signals are fed to multiplexing circuitry operating under control of said scanning position pulses to sequentially select one of said electrical signals at a time.

18. The apparatus of claim 10 wherein said circuit means (c) consists of multiplexing circuitry operating under control of said scanning position pulses.

* * * * *